J. KIRKHAM.
COMPOSITION FOR RAILWAY TIES, &c.
APPLICATION FILED APR. 13, 1908.

942,505.

Patented Dec. 7, 1909.

WITNESSES
INVENTOR

UNITED STATES PATENT OFFICE.

JOSEPH KIRKHAM, OF LOS ANGELES, CALIFORNIA, ASSIGNOR OF ONE-HALF TO WILLIAM ELVIN PRITCHARD, OF LOS ANGELES, CALIFORNIA.

COMPOSITION FOR RAILWAY-TIES, &c.

942,505. Specification of Letters Patent. Patented Dec. 7, 1909.

Application filed April 13, 1908. Serial No. 426,916.

*To all whom it may concern:*

Be it known that I, JOSEPH KIRKHAM, a citizen of the United States, and residing at Los Angeles, in the county of Los Angeles, State of California, have invented certain new and useful Improvements in Composition for Railway-Ties, &c.; and I do declare the following to be a full, clear, and exact description of the invention, such as will enable others skilled in the art to which it pertains to make and use the same.

My invention relates to improvements in composition more especially for use in making railway ties, fence posts, gates, piers for foundations, etc.

It has for its object to provide a composition for the above purposes which is water, fire, rust, decay and vermin proof and indestructible, and which will not expand or contract, and which by its great tensile strength will stand any strain that it is subjected to without affecting it.

Figure 1:
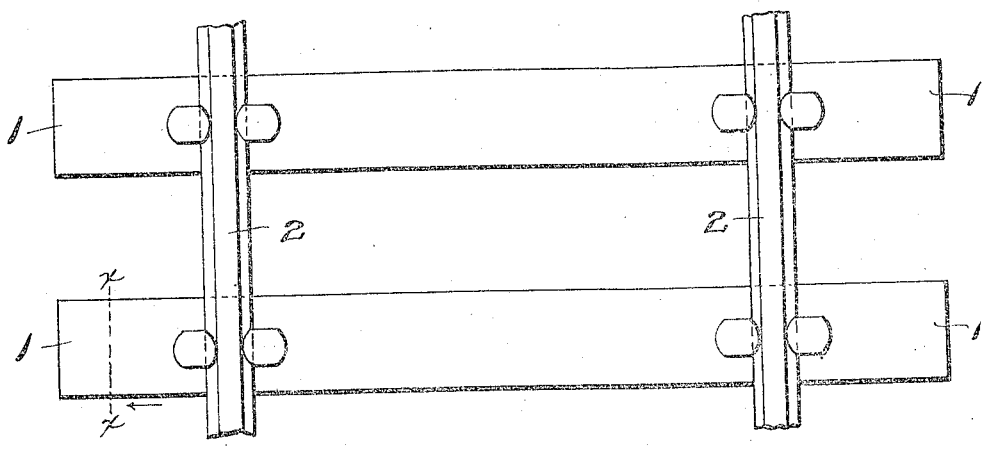
Figure 2:

Referring to the drawing:—Figure 1, is a top plan view of two ties with the rails thereon. Fig. 2, a cross section on line X—X of one of the ties, shown in Fig. 1.

In the drawings in which like numerals of reference denote like parts throughout the several views, 1 represents the railway ties and 2 the rails secured thereto.

The composition for making the railway ties, fence posts, etc., comprises the following ingredients:—Lime rock, about 60 per cent.; kaolin, (common) about 20 per cent.; silica grit, from about 5 to 15 per cent.; pulp fiber, about 12 per cent.; asphaltum composition, or tar composition, about 8 per cent. The exact proportions are not given, as they are not fixed, but have to be varied according to the quality of the materials which vary in different localities. The asphaltum composition comprises about 90 per cent. asphaltum and 10 per cent. of sulfur. The tar composition comprises about 90 per cent. of tar and 10 per cent. of sulfur. One of the above named compositions, but not both, is used at a time.

Instead of using the asphaltum composition or the tar composition as above described, asphaltum or tar may be used when found desirable.

What I claim is:—

1. A composition for use in making railroad cross-ties comprising, lime rock, kaolin, silica grit, pulp fiber, asphaltum or tar compositions, substantially as described.

2. A composition for use in making railway ties comprising lime rock, kaolin, (common), silica grit, pulp fiber, asphaltum or tar, substantially as described.

In testimony whereof, I have signed my name, in the presence of the subscribing witnesses.

JOSEPH KIRKHAM.

Witnesses:
 N. W. FITZ-GERALD,
 WM. W. WATERBURY.